(12) United States Patent
Zhou et al.

(10) Patent No.: US 12,489,353 B2
(45) Date of Patent: Dec. 2, 2025

(54) CIRCUIT FOR LIMITING DUTY CYCLE AND DC SWITCHING POWER SUPPLY WITH CONSTANT OUTPUT

(71) Applicant: AcLeap Power Inc., Taipei (TW)

(72) Inventors: Lishen Zhou, Shanghai (CN); Yifeng Sun, Shanghai (CN); Yuan Liu, Shanghai (CN)

(73) Assignee: Acleap Power Inc., Taipei (TW)

( * ) Notice: Subject to any disclaimer, the term of this patent is extended or adjusted under 35 U.S.C. 154(b) by 207 days.

(21) Appl. No.: 18/501,727

(22) Filed: Nov. 3, 2023

(65) Prior Publication Data

US 2024/0154533 A1   May 9, 2024

(30) Foreign Application Priority Data

Nov. 4, 2022  (CN) .......................... 202211377531.3

(51) Int. Cl.
  *H02M 1/00*   (2007.01)
(52) U.S. Cl.
  CPC ....... *H02M 1/0022* (2021.05); *H02M 1/0025* (2021.05)
(58) Field of Classification Search
  CPC . H02M 1/0016; H02M 1/0022; H02M 1/0025
  See application file for complete search history.

(56) References Cited

U.S. PATENT DOCUMENTS

| 2018/0262107 A1* | 9/2018 | Raval | H02M 3/158 |
| 2019/0260279 A1* | 8/2019 | Turcan | H02M 1/32 |
| 2022/0115954 A1* | 4/2022 | Tang | H02M 3/1566 |
| 2022/0200453 A1* | 6/2022 | Mednik | H02M 1/0025 |

* cited by examiner

*Primary Examiner* — Jue Zhang
(74) *Attorney, Agent, or Firm* — McCarter and English, LLP

(57) ABSTRACT

Embodiments of the present disclosure relate to a circuit for limiting duty cycle for a DC switching power supply. The circuit includes: a timing module and a switch control module. The timing module is configured to cause the variable output voltage to increase to a voltage threshold within a time shorter than a duration time of the first level of the period. The switch control module is configured to: in a period having the duty cycle greater than the maximum limit duty cycle, output a signal enabling the switch to be turned on before the variable output voltage increases to the voltage threshold, and output a signal enabling the switch to be turned off independently of the pulse signal after the variable output voltage increases to the voltage threshold. The circuit enables the duty cycle of the switch not to be excessively large during the transition phase.

18 Claims, 3 Drawing Sheets

CIRCUIT FOR LIMITING DUTY CYCLE AND DC SWITCHING POWER SUPPLY WITH CONSTANT OUTPUT

CROSS-REFERENCE TO RELATED APPLICATIONS

This application claims priority to Chinese Patent Application No. 202211377531.3, filed Nov. 4, 2022, and titled "DUTY CYCLE LIMITING CIRCUIT AND DC SWITCHING POWER SUPPLY WITH CONSTANT OUTPUT", which is hereby incorporated by reference in its entirety.

BACKGROUND

Embodiments of the present disclosure relate to a circuit for limiting a duty cycle for a DC switching power supply, and the DC switching power supply including this circuit.

The description of Background provided herein is generally intended to present the context of the present disclosure. To the extent that this work is described in this Background and may not otherwise be a description of prior art at the time of filing, the inventors' work has neither been explicitly nor implicitly admitted as prior art of the subject matter of the present disclosure.

A pulse width modulated (PWM) DC/DC power supply is commonly used in industrial and commercial fields. The duty cycle is related to an output voltage, an input voltage and a transformation ratio of a transformer in the PWM-DC/DC power supply. When the input voltage or the output load varies, the output voltage is kept constant by adjusting the duty cycle. The feedback loop will adjust the duty cycle as a function of the changes of the input voltage and the load. When the load is large, the duty cycle also needs to be large. When the load is small, the duty cycle needs to be small accordingly.

During a high level of a signal waveform emitted by the PWM modulator, a switch (e.g., a MOSFET) in the PWM-DC/DC power supply is turned on to deliver energy to the load. During a low level of the signal waveform emitted by the PWM modulator, a switch (e.g., the MOSFET) in the PWM-DC/DC power supply is turned off so that no energy is delivered to the load.

As the load switches from a light load (e.g., a zero load) to a full load, for a feedback signal of the feedback loop, the duty cycle needs to increase abruptly, e.g., from 1% to 60%, or from 10% to 60%. However, during the transition of the duty cycle from a small value to a large value, overshoot of the duty cycle occurs, and the duty cycle can reach 85% or even more, then gradually falls and then reaches a steady operating duty cycle of 60%. A large duty cycle (85% or more) during this transition will cause a core device (e.g., a transformer) of the PWM-DC/DC power supply to move into saturation status and cause occurrence of a large burst stress (e.g., a voltage peak) on the switch. This burst stress affects the reliability of the switch (e.g., the MOSFET) in the PWM-DC/DC power supply and even breaks down the MOSFET and causes irreversible damages.

Some conventional PWM control chips have the function of limiting the maximum duty cycle, e.g., limited to 85%. However, this value is fixed and cannot vary with the input voltage. An excessively large duty cycle might still lead to transformer saturation and switch overstress in a dynamic state.

According to a first aspect of the present disclosure, there is provided a circuit for limiting duty cycle for a DC switching power supply, the DC switching power supply including a switch and a pulse signal generating unit, the pulse signal generating unit being configured to generate a pulse signal having a duty cycle, the duty cycle being a ratio of a time of a first level of the pulse signal to a period, the duty cycle being capable of transitioning from a first current duty cycle to a second target duty cycle greater than the first current duty cycle due to a load increase within a plurality of periods. The circuit includes: a timing module and a switch control module. The timing module is electrically connected to an input voltage of the DC switching power supply to output a variable output voltage, wherein the timing module is configured to: in each period of the pulse signal, cause the variable output voltage to gradually increase from an initial value, and in a certain period in which the duty cycle of the pulse signal is greater than a maximum limit duty cycle, cause the variable output voltage to increase to a voltage threshold within a time shorter than a duration time of the first level in the period, wherein the maximum limit duty cycle is greater than the second target duty cycle, and the voltage threshold corresponds to the maximum limit duty cycle. The switch control module is electrically connected to the timing module, the pulse signal generating unit and the switch, and is configured to: in the certain period in which the duty cycle of the pulse signal is greater than the maximum limit duty cycle, output a first control signal enabling the switch to be turned on before the variable output voltage increases to the voltage threshold, and output a second control signal enabling the switch to be turned off independently of the pulse signal after the variable output voltage increases to the voltage threshold.

The variable output voltage is implemented by the timing module. By setting a reasonable voltage threshold and the cooperation of the timing module and the switch control module, it is possible to achieve a desired maximum limit duty cycle (the desired maximum limit duty cycle corresponds to the voltage threshold, and for example is slightly larger than the second target duty cycle, and much smaller than the maximum duty cycle that can be achieved during the transition phase), so that the maximum limit time of the first level (e.g., high level) of the control signal received by the switch can be shorter than the duration of the first level (e.g., high level) of the pulse signal having the maximum duty cycle achieved during the transition phase. Therefore, according to the circuit for limiting duty cycle of the present embodiment, the duty cycle of the control signal of the switch can be made smaller than the possible maximum duty cycle of the pulse signal during the transition phase, thereby protecting the switch and preventing the transformer from being saturated.

In some embodiments, the switch control module includes: a first input configured to receive a pulse signal from the pulse signal generating unit; a second input configured to be connected to the timing module to receive a signal associated with the variable output voltage of the timing module, wherein upon determining that the variable output voltage is less than the voltage threshold, the associated signal is a first signal that enables the switch control module to amplify the received pulse signal, and upon determining that the variable output voltage is greater than or equal to the voltage threshold, the associated signal is a second signal that enables the switch control module not to amplify the received pulse signal; and a control module output configured to: in each period of the pulse signal, upon determining that the second input receives the first signal, output a third control signal enabling the switch to be turned on according to the first level of the pulse signal and turned off according to a second level of the pulse signal opposite to the first level, and upon determining that the second input receives the second signal, output the second control signal.

In this embodiment, the switch control module includes a second input (i.e., the enable pin) and is capable of amplifying and de-amplifying the pulse signal received at a first input (i.e., an input end), respectively, according to an enable signal and a disable signal received at the enable pin. Furthermore, by associating the signal received by the enable pin with the magnitude of the variable output voltage, the duty cycle of the switch control signal output by the switch control module can be associated with the voltage threshold, thereby controlling the duty cycle of the switch control signal to be below the maximum limit duty cycle. In one example, a gate of the switch is turned on when applied with a sufficient forward voltage, the first level can be a high level and the second level can be a low level. In another example, the first level can be a low level and the second level can be a high level, and since the gate of the switch is turned on when applied with the sufficient forward voltage, the circuit for limiting duty cycle according to this example further includes an inverting circuit causing the first level at the low level switch to the high level, and cause the second level at the high level to switch to the low level.

In some embodiments, the switch control module may further include a comparison unit connected between the timing module and the second input of the switch control module and include: a non-inverting input configured to be connected to a reference voltage source, wherein a voltage value of a reference voltage $V_{ref}$ output by the reference voltage source is related to the voltage threshold; an inverting input configured to receive the variable output voltage of the timing module; and a comparison unit output electrically connected to the second input of the switch control module, wherein the comparison unit is configured to: upon determining that the variable output voltage $V_A$ received at the inverting input exceeds the reference voltage, output the second signal through the comparison unit output to the second input. By means of the comparison unit, the variable output voltage of the timing module can be associated with the enable signal received by the enable pin of the switch control module.

In some embodiments, the timing module includes: a capacitor, a first polar plate of the capacitor being connected to an input voltage $V_{in}$ of the DC switching power supply, and a second polar plate of the capacitor being grounded; and a first switch connected in parallel with the capacitor, wherein the first switch is configured to be switched on at a rising edge of each period of the pulse signal to discharge the capacitor, and is configured to be switched off after the rising edge of each period of the pulse signal to charge the capacitor with the input voltage $V_{in}$ of the DC switching power supply, so as to gradually increase the variable output voltage $V_A$ of the timing module from the initial value. Through the embodiment, the capacitor can be controlled to discharge using the first switch at the beginning of a period, such that the voltage of the capacitor in each period of the transition phase can start to increase from the same initial value.

In some embodiments, the timing module further includes a first resistor connected in series between the first polar plate of the capacitor and the DC switching power supply, the variable output voltage is a voltage at an end of the first resistor opposite to the DC switching power supply, wherein a time for the variable output voltage to increase to the voltage threshold is determined based at least in part on a resistance of the first resistor and a capacitance value of the capacitor.

In some embodiments, the first switch includes a transistor in parallel with the capacitor, and a transistor control circuit, the transistor configured to: turn on at the rising edge of the pulse signal and turn off after the rising edge; and the transistor control circuit is configured to: receive the pulse signal and output a control signal controlling the transistor to turn on and turn off based on the pulse signal. With the transistor and the transistor control circuit, it is possible to short out the transistor and the capacitor, and discharge the capacitor in synchronization with the rising edge of the pulse signal, and then to charge the capacitor after the rising edge, so that the charging and discharging of the capacitor is better synchronized with the pulse signal.

In some embodiments, the transistor includes: a gate electrically connected to the transistor control circuit; a source configured to be grounded; and a drain configured to be connected to the first polar plate of the capacitor, and the transistor control circuit includes: further capacitor connected to the gate and configured to receive the pulse signal; and a second resistor, a first end thereof being connected to a node between the further capacitor and the gate, and a second end thereof being grounded; wherein the further capacitor is configured to be charged at the rising edge of each period of the pulse signal to turn on the transistor and be fully charged after the rising edge to turn off the transistor. With this type of transistor control circuit, the transistor of the first switch can be controlled in a simple manner to perform its function, i.e., switch on at the rising edge of the pulse signal and switch off after the rising edge.

In some embodiments, the input voltage yin of the DC switching power supply includes a plurality of input voltages within a range, wherein the plurality of input voltages at least includes: a first input voltage, the variable output voltage $V_A$ of the timing module rising to the voltage threshold at a first time corresponding to the first input voltage; and a second input voltage, the variable output voltage $V_A$ of the timing module rising to the voltage threshold at a second time corresponding to the second input voltage; wherein the first input voltage is less than the second input voltage and the first time is longer than the second time. In this embodiment, the time for the variable output voltage to rise to the voltage threshold varies depends on the input voltage, so the DC switch can be adapted to a wide range of input voltages and achieve the duty cycle limiting function. That is, if the input voltages are different, the maximum limit duty cycles that can be achieved for the control signal of the switch are also different.

In some embodiments, the comparison unit further includes a clamp diode configured to clamp a maximum voltage at the inverting input to a particular voltage value. With the clamp diode, the voltage at the inverting input of the comparator can be clamped at a certain value without becoming too high, so that the comparator can be protected.

According to a second aspect of the present disclosure, there is provided a DC switching power supply having a constant output, including: the circuit according to the first aspect; a switch connected between an input and an output of the DC switching power supply; and a pulse signal generating unit configured to generate a pulse signal for controlling the switch to turn on and turn off, wherein the circuit is electrically connected between the pulse signal generating unit and the switch. By limiting the duty cycle by the circuit for limiting duty cycle during the transition phase from a small duty cycle to a large duty cycle, the duty cycle of the signal for controlling the switch does not become too large and less than the possible maximum duty cycle of the pulse signal, and core components of the DC switching power supply, such as the switch and the transformer, therefore can be protected.

It should be understood that the description in the Summary is not intended to limit the key or critical features of the embodiments of the disclosure, nor is it intended to limit the scope of the disclosure. Other features of the present disclosure will become readily apparent from the following description.

BRIEF DESCRIPTION OF THE DRAWINGS

The above and other objectives, features, and advantages of example embodiments of the present disclosure will become more apparent from the following detailed description with reference to the accompanying drawings. In the figures, the same or like reference numerals denote to the same or like elements, wherein.

DETAILED DESCRIPTION

Figure 1:
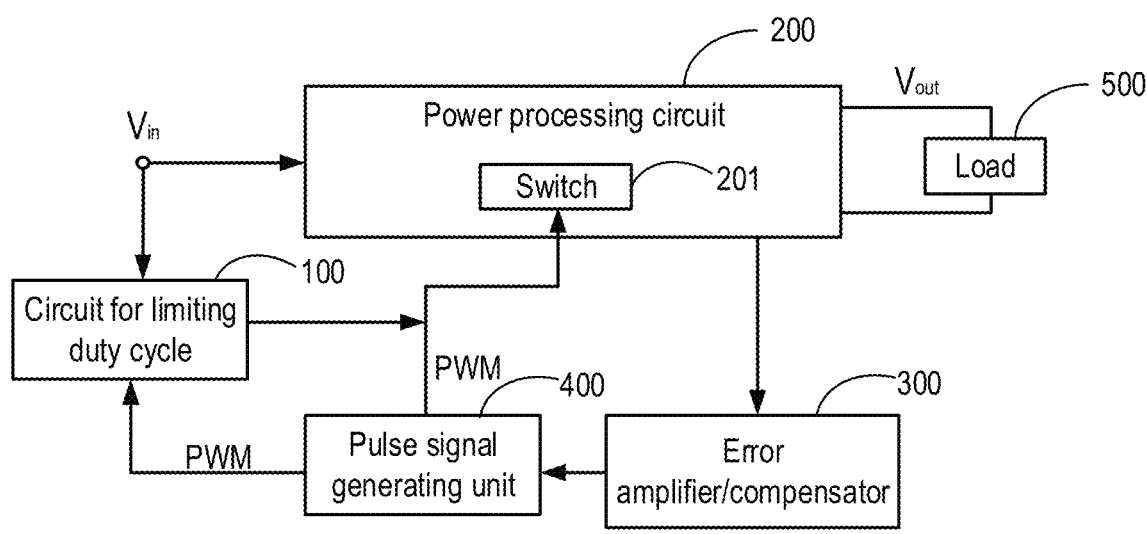
FIG. 1 illustrates a schematic diagram of an example of an environment to which some embodiments according to the present disclosure apply.

Various embodiments are now described with reference to the drawings, wherein similar reference numerals are used to denote similar elements throughout the text. In the following description, for purposes of illustration, numerous specific details are set forth in order to provide a thorough understanding of one or more embodiments. However, in some or all cases, it will be apparent that any embodiment described below may be put into practice without employing specific design details described below. In other instances, well-known structures and devices are shown in block diagram form in order to facilitate describing one or more embodiments. The following presents a simplified summary of one or more embodiments in order to provide a basic understanding of such embodiments. This summary is not a detailed overview of all expected embodiments, and is neither intended to identify key or critical elements of all embodiments nor delineate the scope of any or all embodiments.

References to "an embodiment" or "one embodiment" in the framework of this description are intended to indicate that a particular configuration, structure, or characteristic described in connection with the embodiment is included in at least one embodiment. Thus, phrases such as "in an embodiment" or "in one embodiment" that may present in one or more points of the description do not necessarily refer to the same embodiment. Furthermore, the particular features, structures, or characteristics may be combined in any suitable manner in one or more embodiments.

Unless otherwise indicated, when reference is made to two elements being connected together, this means a direct connection in the absence of any intermediate element other than a conductor; and when reference is made to two elements being coupled together, this means that the two elements may be connected or they may be coupled via one or more other elements.

In the following disclosure, when references are made to absolute positional modifiers (such as the terms "front", "back", "top", "bottom", "left", "right", etc.) or relative positional modifiers (such as the terms "above", "below", "higher", "lower", etc.), or made to directional modifiers (such as "horizontal", "vertical", etc.), they refer to the orientations shown in the figures unless otherwise indicated. Unless otherwise specified, the expressions "about", "approximately", "substantially", and "or" mean less than 10%, preferably less than 5%.

As noted above, some conventional PWM control chips have the function of limiting maximum duty cycle, for example, limited to 85%. However, this value is fixed and cannot vary with the input voltage. An excessively large duty cycle might still lead to transformer saturation and switch overstress in a dynamic state. This overstress affects the switch (e.g., MOSFET) in the PWM-DC/DC power supply and even breaks down the MOSFET and causes irreversible damages.

The PWM-DC/DC power supply according to the present disclosure is provided with a circuit for limiting duty cycle, and this circle is capable of limiting the duty cycle to be only slightly larger than the target duty cycle, e.g., only 3 to 8% above the target duty cycle depending on the input voltage of the power supply and the signal fed back by the modulation module, during the transition from a small duty cycle needed by a light load to a large duty cycle needed by a heavy load.

FIG. 1 illustrates a schematic diagram of an example of an environment to which some embodiments according to the present disclosure apply.

As shown in FIG. 1, a PWM-DC/DC power supply 1000 includes a power processing circuit 200, an error amplifier/compensator 300, and a PWM modulator 400 (the PWM modulator 400 may also be referred to as a pulse signal generating unit). The error amplifier/compensator 300 forms a feedback circuit that detects a condition of a load and feeds this back to the PWM modulator 400, and the PWM modulator 400 generates a pulse signal with an appropriate duty cycle according to the condition of the load.

As shown in FIG. 1, the power processing circuit 200 includes a switch 201 and a transformer (not shown). The topology of the power processing circuit 200 may not be limited to topology such as forward, half-bridge, full-bridge, push-pull, etc. The switch 201 processes an input voltage $V_{in}$ and then outputs a desired voltage Vons to a load 500. During each period of the pulse signal, a ratio of a turn-on time to a turn-off time of the switch 201 corresponds to the duty cycle of the PWM pulse signal generated by the modulator 400, e.g., during a high level of the pulse signal, the switch is turned on so that the input voltage $V_{in}$ powers the load, and during a low level of the pulse signal, the switch is turned off so that the input voltage $V_{in}$ suspends powering the load.

In one embodiment, the switch 201 may be a MOSFET, in which a limited voltage can be sustained between the drain and source of the MOSFET, and if the voltage is too high, it will break down a metal oxide and cause irreversible damages.

The frequency of the pulse signal generated by the modulator 400 is relatively high, typically in a range of between tens of kHz to hundreds of kHz, in one example, e.g., around 125 kHz, and one period of the pulse signal is 8 μs. In one embodiment, the input voltage yin for example may be maintained at 35V, while the output voltage is maintained at 12V and the output current is maintained at 25A. Alternatively, the input voltage yin may for example be maintained at 75V, while the output voltage is also maintained at 12V and the output current is also maintained at 25A. Since the output voltage or load is constant, the duty cycle of the pulse signal needs to be large when the input voltage $V_{in}$ is small, and the duty cycle of the pulse signal needs to be small when the input voltage $V_{in}$ is large. The input voltage according to the present disclosure may be any voltage within a range and not limited to the 35V and 75V described above.

As described above, the duty cycle of the desired pulse signal varies, for example, from 1% to 59% as the load changes from light to heavy, e.g., from zero load to full load. However, in a case where the duty cycle of the pulse signal is not limited, the duty cycle of the pulse signal may be overshot, e.g., suddenly increase from 1% to 75% or even more, during a transition from a small duty cycle to a large duty cycle due to the influence of feedback component in the circuit. Thus, during some periods of the transition phase, the duty cycle (e.g., 75%) of the pulse signal is greater than a maximum limit duty cycle (e.g., 65%) which in one example is greater than a second target duty cycle (e.g., 59%). During some periods of the transition phase, the duty cycle of the pulse signal may also be less than the maximum limit duty cycle. After a number of cycles, the duty cycle of the pulse signal stabilizes to the second target duty cycle in an attenuating and oscillating manner.

The DC switch power supply according to the present application further includes a circuit 100 for limiting duty cycle, and this circuit 100 is capable of limiting the duty cycle to be only slightly larger than a desired target duty cycle, such as 3% to 8% larger than the target duty cycle, during the transition of the load from a light load to a heavy load.

The circuit 100 for limiting duty cycle according to an embodiment of the present disclosure will be described below with reference to FIG. 2.

Figure 2:
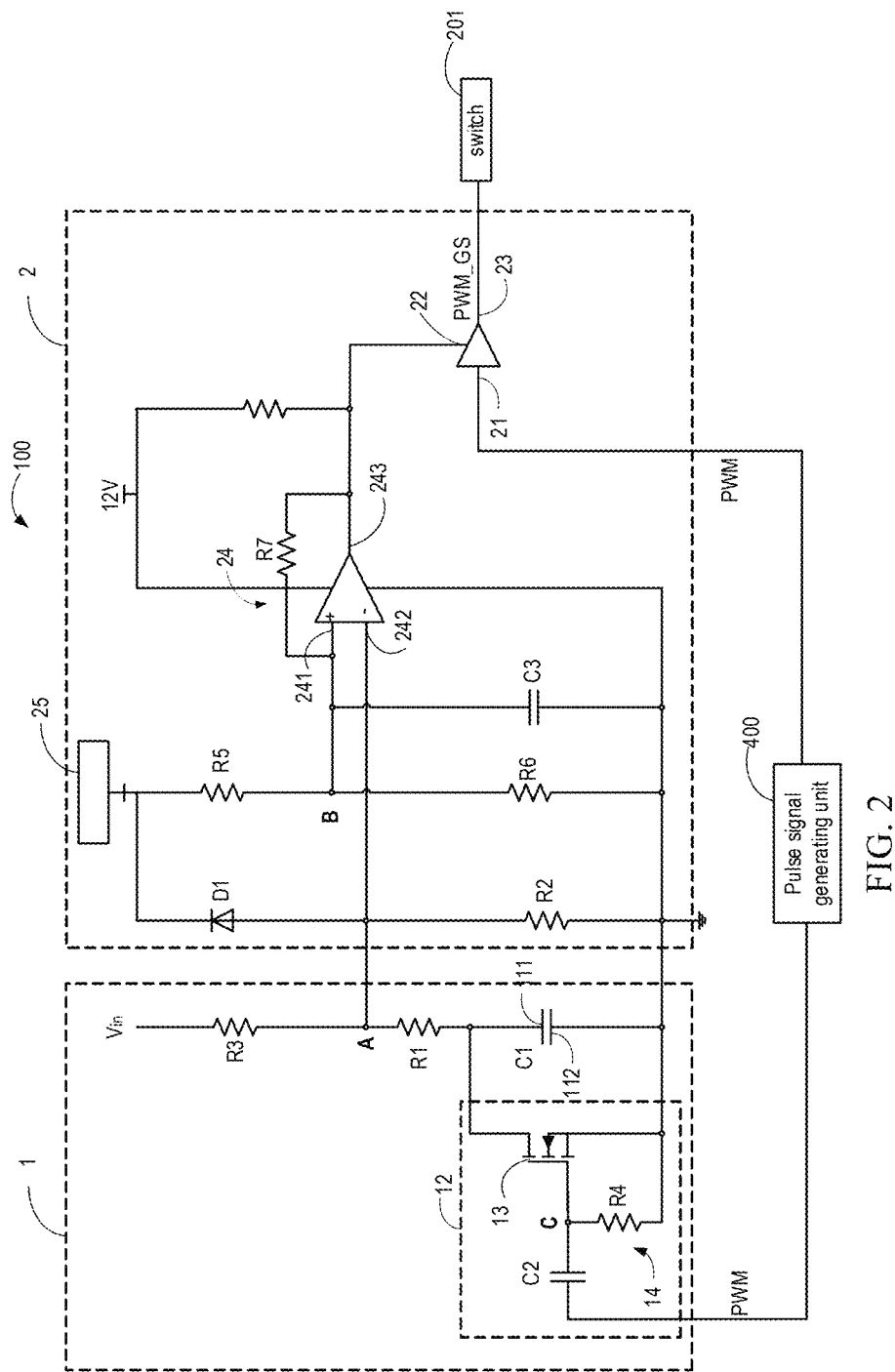
FIG. 2 illustrates a schematic diagram of a circuit according to an embodiment of the present disclosure.

As shown in FIG. 2, the circuit 100 for limiting duty cycle includes a timing module 1 that is connected to an input voltage yin of a DC switching power supply and outputs a variable output voltage $V_A$ at the node A. During the transition of the duty cycle of the pulse signal from a first current duty cycle (e.g., 1% for a zero load at an input voltage of 35V) to a second target duty cycle (e.g., the second target duty cycle is 59% for a full load at an input voltage of 35V) larger than the first current duty cycle, the variable output voltage $V_A$ gradually increases from the same initial value in each period of the pulse signal, and the initial value for example may be close to 0V.

When the duty cycle is greater than the maximum limit duty cycle in a certain period of the pulse signal (this certain period usually occurs during the transition), the timing module 1 is further configured to: within a time shorter than a duration time of a high level in the period, enable the variable output voltage $V_A$ to increase to a voltage threshold V threshold, wherein the maximum limit duty cycle is larger than the second target duty cycle, and the voltage threshold V threshold corresponds to the maximum limit duty cycle.

In one example, for the pulse signal with a target duty cycle of 59%, during the transition phase, for a first period in which the duty cycle of a pulse signal is, for example, 75%, the variable output voltage $V_A$ is caused to increase to the voltage threshold V threshold at a time corresponding to 65% of the first period. For a second period in which the duty cycle of the pulse signal is, for example, 50%, the variable output voltage $V_A$ is also caused to increase to the voltage threshold V threshold at the time corresponding to 65% of the second period, because the timing module 1 is connected to the input voltage such that the variable output voltage $V_A$ can always increase from an initial value close to 0V.

As shown in FIG. 2, the circuit for limiting duty cycle 100 further includes a switch control module 2 including a first input 21, a second input 22 and an output 23. In one example, a driver included in the switch control module 2 is used to amplify the pulse signal received from the first input upon receiving an enable signal from the second input 22, to generate a driving signal capable of driving a switch 201, e.g., a MOSFET-type switch. The first input 21 is configured to receive a pulse signal generated by the PWM modulator 400. The first input 21 may for example be an input pin of a switch driver 20.

The second input 22 (i.e., the enable pin of the driver 20) of the switch control module 2 is configured to receive a signal associated with the variable output voltage $V_A$ of the timing module 1. In one example, the second input 22 is, for example, an enable pin of the switch driver. In a case where the second input 22 receives a high level, the pulse signal input by the first input 21 can be amplified by an internal structure of the driver to generate a suitable driving signal for driving a gate of the switch 201 and output to the switch 201 via the output 23. In a case where the second input 22 receives a low level, the driver is no longer active, i.e., the pulse signal is not amplified, and the pulse signal received by the first input 21 cannot be transmitted to the output 23. If the variable output voltage $V_A$ is less than a voltage threshold V threshold, the signal associated with the variable output voltage $V_A$ of the timing module 1 is a high-level signal (i.e., the second input 22 receives the high-level signal), thereby enabling the driver to control the switch 201 to be switched on according to the high level of the pulse signal and switched off according to the low level of the pulse signal. If the variable output voltage $V_A$ increases to the voltage threshold $V_{\_threshold}$, the signal associated with the variable output voltage $V_A$ of the timing module 1 is changed to be a low-level signal (i.e., the second input 22 receives the low-level signal), thereby disabling the driver so that the switch 201 cannot receive the driving signal and then switches off.

The output 23 of the switch control module 2 is configured to: when the second input 22 receives the high-level signal, output signals PWM_GS for controlling the switch 201 to be switched on and off based on the high-level signal and low-level signal of the pulse signal received by the first input 21, respectively; and when the second input 22 receives the low-level signal, output a control signal PWM_GS causing the switch 201 to be forcibly turned off.

In the circuit 100 for limiting duty cycle according to the present disclosure, before the variable output voltage $V_A$ of the timing module 1 increases to the threshold voltage V threshold, the second input 22 receives a first signal (namely, an enable signal of the driver), and the driver included in the switch control module 2 can work, so that the output 23 of the switch control module outputs a signal PWM_GS for enabling the switch to be switched on or off according to the high level or low level of the pulse signal, namely, when the pulse signal has the high level, the switch is switched on, and when the pulse signal has the low level, the switch is switched off. After the variable output voltage $V_A$ of the timing module 1 is increased to the threshold voltage V threshold, the second input 22 receives a second signal (i.e., a disable signal of the driver), and the driver stops operating, so that the output 23 does not output the driving signal, so that the switch 201 is switched off.

During a period in which the duty cycle (e.g., 59%) of the pulse signal is less than the maximum limit duty cycle (e.g., 65%), the variable output voltage $V_A$ has not yet increased to the threshold voltage before the time corresponding to 65% of the period, and the second input 22 receives the first signal (i.e., the enable signal). During the corresponding time after 65% of the period, the variable output voltage $V_A$ increases above the threshold voltage, so that the second input 22 receives the second signal (i.e., the disable signal). Thus, within a time less than 59% of a period in which the duty cycle of the pulse signal is, for example, 59%, the pulse signal is at a high level, the second input 22 receives the enable signal and thus the switch 201 is switched on. Within a time of 59% to 65% of the period, the second input 22 still receives the enable signal, but at this time the pulse signal is at a low level, so the switch 201 is switched off in response to the low driving signal. Within a time of 65% or later of the period, the variable output voltage V A increases to and above the threshold voltage, the second input 22 receives the disable signal, and the received disable signal also causes the switch 201 to switch off. At this time, the switch 201 is already switched off, so that it has no impact on the switched-off state of the switch 201 even though the disable signal is received. That is, the circuit 100 for limiting duty cycle does not affect the switch control module 2 to control the switch 201 according to the pulse signal in a period in which the duty cycle is less than the maximum limit duty cycle.

During a period in which the duty cycle (e.g., 75%) of the pulse signal is greater than the maximum limit duty cycle (e.g., 65%), the variable output voltage $V_A$ has not increased to the threshold voltage before a time corresponding to 65% of the period, and the second input 22 receives the first signal (i.e., the enable signal). Within a time corresponding to 65% of the period and time later than this, the variable output voltage $V_A$ increases above the threshold voltage so that the second input 22 receives the second signal (i.e., the disable signal). Within a time less than 65% of a period in which the duty cycle of the pulse signal is, for example, 75%, the second input 22 receives the enable signal, and the pulse signal is at a high level, and thus the switch 201 is turned on; within a time corresponding to 65% to 75% of the period, the pulse signal is still at a high level, but the second input 22 receives the disable signal, and the driver is no longer active and cannot output the high driving signal. Therefore, the switch 201 is switched off, even if the pulse signal is still at a high level. Within a time corresponding to 75% to 100% of the period (i.e., when the pulse signal is at a low level), as the variable output voltage $V_A$ continues to increase and increases to a level greater than the threshold voltage, the second input 22 still receives the disable signal, so the switch 201 remains switched-off. Thus, within the period where the duty cycle is greater than the maximum limit duty cycle, the circuit 100 for limiting duty cycle according to the present disclosure can limit the maximum duty cycle of the control signal of the switch to the maximum limit duty cycle without being too high. Therefore, the switch does not generate overstress and the transformer does not saturate.

At a starting point of the next cycle of the pulse signal, since the variable output voltage $V_A$ returns to the initial value (close to 0V), the second input 22 starts receiving the enable signal again from the starting point of the next cycle.

During the transition phase (e.g., within a few cycles), the duty cycle of the pulse signal for example reach 77%, or even more, occupying most of each period. In the circuit 100 for limiting duty cycle according to the present disclosure, the timing module 1 is connected to the input voltage $V_{in}$ of the DC switching power supply so that its voltage can gradually increase from the same initial value (e.g., 0V) in each period of the transition phase. By setting a reasonable voltage threshold, in a period with a large duty cycle, the variable output voltage $V_A$ of the timing module 1 can reach this voltage threshold within a time less than the duration time of the high level of the pulse signal in this period. The switch control module 2 can generate a corresponding control signal by receiving a signal associated with this gradually increasing output voltage, for example when the voltage $V_A$ of the timing module 1 reaches the voltage threshold, the second input 22 (e.g., the enable pin) of the switch control module 2 starts to receive a low level and the switch control module 2 disables its driver. Therefore, the gate of the switch 201 cannot receive a high-level signal, so that the switch 201 cannot be turned on, and the transformer in the power processing circuit 200 stops exciting and thus does not enter a saturated state.

In a period with a large duty cycle, after the voltage of the timing module 1 reaches the voltage threshold, although the first input 21 still receives a pulse signal at a high level, the low level received by the second input 22 (i.e., the enable pin) of the driver included in the switch control module 2 has caused the driver included in the switch control module 2 to no longer work, and therefore the switch 201 cannot be switched on according to the high level of the pulse signal received at the first input 21, and therefore the core component in the direct current switch power supply will not be in a saturated state and will not generate a large stress. Thus, with the circuit 100 for limiting duty cycle according to the present disclosure being used, the core components in the power processing circuit in the DC switching power supply, such as the MOSFET-type switch and transformer in the circuit, can be protected.

In the DC switching power supply according to the present disclosure, in one example, the transition phase may include a number of periods. After the transition phase, as the output voltage returns to the target value again, the duty cycle of the pulse signal changes to a desired duty cycle, e.g., 59% for a 35V input voltage as described above. During a steady state after the transition phase, the switch control module 2 can generate a control signal to control the switching on and off of the switch 201 based on the received pulse signal having the second target duty cycle (e.g., 59%), e.g., the switch 201 is switched on when the pulse signal is at a high level and switched off when the pulse signal is at a low level.

As shown in FIG. 2, the switch control module 2 includes a comparison unit 24. The comparison unit 24 is connected between the timing module 1 and the second input 22 of the switch control module 2. With the comparison unit being provided, the signal received by the second input 22 (e.g., the enable pin) of the switch control module 2 can be associated with the voltage of the timing module 1.

As shown in FIG. 2, the comparison unit 24 includes: a non-inverting input 241 configured to receive a reference voltage $V_{ref}$ capable of being equal to the above-mentioned voltage threshold; an inverting input 242 configured to receive the variable output voltage $V_A$ of the timing module 1; and an output 243 electrically connected to the second input 22 of the switch control module 2. The comparison unit 24 is configured in a way that upon determining that the variable output voltage $V_A$ of the timing module 1 exceeds the reference voltage $V_{ref}$, the output 243 outputs a low level and thereby outputs a low voltage signal to the second input 22, i.e., outputs a low voltage signal to the enable pin of the switch control module 2, to disable the driver included in the switch control module 2, so that a high level cannot be output to the switch 201 through the output 23 such that the switch 201 switches off. Therefore, the variable output voltage $V_A$ of the timing module 1 can be associated with the enable pin of the driver included in the switch control module 2 through the comparison unit 24; when the variable output voltage $V_A$ exceeds the voltage threshold, the driver included in the switch control module 2 cannot operate so that the switch 201 cannot be switched on.

As shown in FIG. 2, the timing module 1 according to the present disclosure includes a capacitor C1 and a first switch 12. A first polar plate 111 of the capacitor C1 is connected to the input voltage $V_{in}$ and a second polar plate 112 of the capacitor C1 is connected to ground. As shown in FIG. 2, the first polar plate 111 of the capacitor C1 is connected to the input voltage $V_{in}$, for example, through a resistor R3, so that current from the input voltage $V_{in}$ flows through the resistor R3 to charge the capacitor C1. In a preferred example, as shown in FIG. 2, the timing module 1 further includes a resistor R1 and a resistor R2, and the variable output voltage $V_A$ of the timing module 1 is the voltage at the node A between the resistors R3 and R1. By rationally setting the resistance values of the resistor R3, the resistor R1 and the resistor R2 and the capacitance of the capacitor C1, a reasonable threshold value for the variable output voltage $V_A$ can be obtained, so that the time to rise to the voltage threshold is shorter than the duration time of the high level of the duty cycle in each period of the transition phase. In a preferred example, a value of resistance of resistor R1 is much less than that of resistor R3 and resistor R2, and the value of resistance of resistor R2 is much greater than that of resistor R3, so that the voltage at node A is equivalent to the voltage on the first polar plate 111 of capacitor C1. Due to the charging effect of the capacitor C1, the voltage on the first polar plate 111 of the capacitor C1 gradually increases, so that the voltage at the node A also gradually increases, thereby increasing to the above-mentioned voltage threshold.

As shown in FIG. 2, the first switch 12 is connected in parallel with the capacitor C1. The first switch 12 is configured to turn on at a rising edge (which is in a quite short time) of each period of the pulse signal so that the charge on the capacitor C1 is discharged through the turned-on first switch 12 so that the voltage on the first polar plate 111 of the capacitor C1 is reduced to an initial value which can approach 0V, such that the capacitor C1 can gradually increase from the same initial value every period during the transition phase of the pulse signal. The second switch 12 is further configured to switch off after the rising edge of each period of the pulse signal, so that the capacitor C1 no longer forms a short-circuit with the switch 12. The input voltage $V_{in}$ of the DC switching power supply may be directly used to charge the capacitor C1, so that the voltage on the first polar plate 111 of the capacitor C1 gradually increases, so that the variable output voltage $V_A$ of the timing module 1 also gradually increases.

When $V_A$ increases to the voltage threshold $V_{\_threshold}$, this voltage threshold V threshold may be set equal to the reference voltage V ref of the comparison unit 24, so that the comparison unit 23 outputs a low voltage signal, which is input to the second input 22 (i.e., the enable pin of the driver included the switch control module 2), so that the driver stops working.

As shown in FIG. 2, the comparison unit 24 further includes a reference power supply 25 having a voltage of, for example, 5V. The comparison unit 24 further includes a resistor R5 and a resistor R6. A reasonable reference voltage $V_{ref}$ can be obtained through the loop including the resistors R5 and R6, and the reference power supply 25. The non-inverting input terminal 241 of the comparison unit 24 is connected at a node B between the resistor R5 and the resistor R6 so that the voltage at the node B serves as the reference voltage $V_{ref}$. In one example, the reference voltage $V_{ref}$ is about 1.853V. Therefore, the above-mentioned voltage threshold $V_{\_threshold}$ for the variable output voltage $V_A$ may be 1.853V. Although the reference voltage is implemented using the reference power supply 25, and the voltage division of resistors R5 and R6, those skilled in the art will appreciate that other alternatives may be used to implement the reference voltage, such as through a voltage regulator chip, etc. All these alternatives fall within the scope of the present application.

As shown in FIG. 2, in one example, the first switch 12 includes an NMOS transistor 13 and a transistor control circuit 14. The transistor control circuit 14 controls a gate of the NMOS transistor 13 so that at the rising edge of each period of the pulse signal, the voltage difference across the gate and source of the NMOS is greater than a turn-on voltage threshold, so that the NMOS transistor turns on to form a short circuit with the capacitor C1 to discharge the capacitor C1 and then the voltage on its first polar plate 111 drops to 0V.

As shown in FIG. 2, the NMOS transistor 13 includes: a gate configured to be connected to receive a high voltage signal at the rising edge of the pulse signal and to return to a low voltage signal after the rising edge; a source configured to ground; and a drain configured to be connected to the first polar plate 111 of the capacitor C1. The first switch 12 may include a transistor control circuit 14 to control the voltage input to the gate. With the transistor control circuit 14 being provided, the gate receives the high level at the rising edge of the pulse signal and returns to the low level after the rising edge of the pulse signal. As shown in FIG. 2, the transistor control circuit 14 includes a further capacitor C2 and a resistor R4. The capacitor C2 is connected to the gate of the NMOS transistor 13 and is configured to receive a pulse signal. A first terminal of the resistor R4 is connected to a node C between the capacitor C2 and the gate of the NMOS transistor 13, and a second terminal of the resistor R4 is connected to ground.

At the rising edge of each period of the pulse signal, through a path formed with the resistor R4, the voltage of the rising edge abruptly turns on the capacitor C2 due to the characteristics of the capacitor, thereby charging the capacitor C2. In one example, it takes 200 ns for the capacitor C2 to be fully charged, that is, the duration time in which the capacitor C2 is turned on is 200 ns, so that during this time, the voltage on the gate of the NMOS transistor 13 is made equivalent to the voltage on the first terminal of the resistor R4, so that a voltage difference between the gate and the source of the NMOS transistor 13 is greater than a turn-on voltage threshold, so that the NMOS transistor 13 is turned on to short out the capacitor C1, thereby discharging the capacitor C1. After passing the rising edge of the pulse signal, e.g., after 200 ns, the capacitor C2 is already fully charged, the voltage of the capacitor C2 is equivalent to the high level of the pulse signal, the capacitor C2 is no longer ON, so that the voltage on the first terminal of the resistor R4 decreases, e.g., decreases to ground voltage, so that the voltage difference between the gate and the source of the NMOS transistor 13 is close to zero, thereby smaller than the turn-on voltage threshold, and the NMOS transistor 13 is thus switched off. With the NMOS transistor 13 turned off, the input voltage yin charges the capacitor C1 through the resistors R3 and R1. The above-mentioned 200 ns is only a momentary time for 8 μs of a period, and the capacitor C1 is charged in most of the one period so that its voltage gradually increases.

Although it is described in the above-mentioned embodiments that the NMOS transistor is turned on at the rising edge and turned off after the rising edge by using an NMOS transistor 13 and the gate control circuit 14 including the capacitor C1 and the resistors R4, those skilled in the art can envisage other alternative implementations, e.g., using a PMOS transistor or a triode to implement the turn-on and turn-off as long as the circuit enables discharging the capacitor at the rising edge and charging the capacitor after the rising edge. All the alternative implementations fall within the scope of protection of the present application.

In one example, by rationally designing the resistance values of the resistors R3, R1, R2, the capacitance of the capacitor C1, and the voltage threshold, it is possible to make the time for the voltage $V_A$ at node A to reach the threshold voltage during the transition phase less than the duration time of the high level of the pulse signal.

In one example, for the DC switching power supply with the 35V input voltage described above and the DC switching power supply with the 75V input voltage described above, the resistance value of R3 is about 100 k ohms, the resistance value of R1 is about 402 ohms, the resistance value of R2 is about 825 k ohms, and capacitance of the capacitor Cl is about 1000 pF. The effect shown below with reference to FIG. 3B can be achieved by designing such capacitance value and resistance values. Although only 35V and 75V input voltages are listed in the examples of the present disclosure, the input voltage of the present disclosure can vary within a range and include a plurality of input voltages. The time for the variable output voltage $V_A$ of the timing module 1 to reach the voltage threshold varies for different input voltages.

The second target duty cycle is 59% for the input voltage of 35V, and the maximum duty cycle of the control signal of the switch during the transition phase can be limited to around 65% by the circuit 100 for limiting duty cycle of the present disclosure. The second target duty cycle is 25% for the input voltage of 75V, and the maximum duty cycle of the control signal of the switch during the transition phase can be limited to around 29% by the circuit 100 for limiting duty cycle of the present disclosure. The higher the input voltage, the shorter the time for the capacitor of the timing module 1 to be charged to the threshold voltage. Therefore, as compared to a smaller input voltage, the maximum limit duty cycle that can be achieved is also smaller. Thus, different maximum limiting duty cycles can be achieved during the transition phase for different input voltages.

Figure 3A:
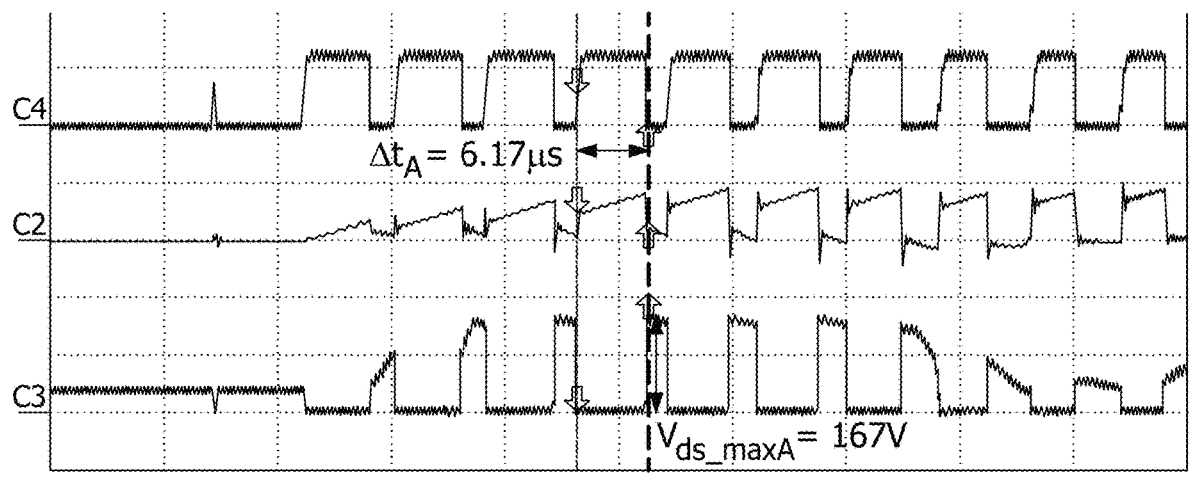
FIG. 3A illustrates a schematic diagram of a test result during a duty cycle transition without the circuit according to the present disclosure.
Figure 3B:
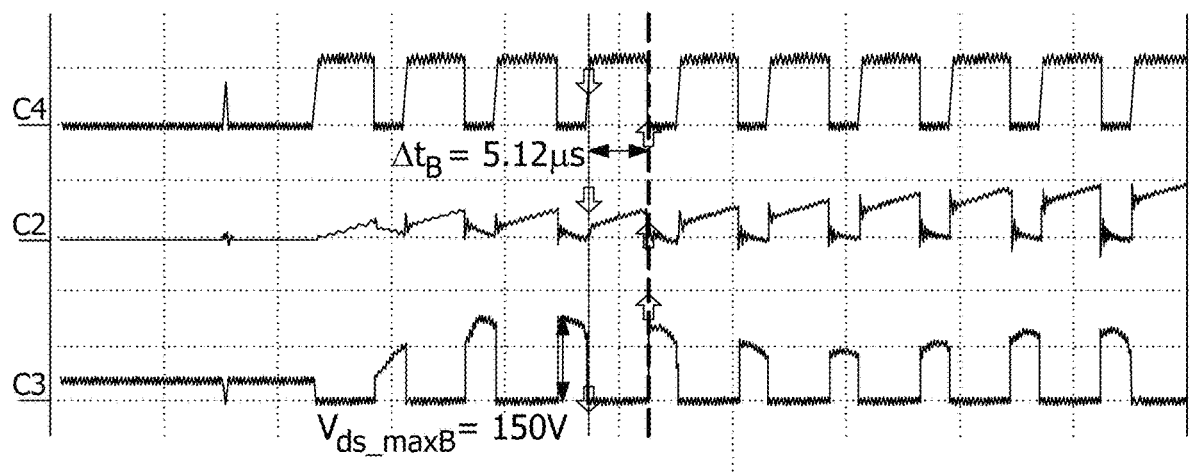
FIG. 3B illustrates a schematic diagram of a test result during a duty cycle transition using the circuit according to the present disclosure.

FIG. 3A illustrates a schematic diagram of a test result during a duty cycle transition without a circuit for limiting duty cycle. FIG. 3B illustrates a schematic diagram of a test result during a duty cycle transition using a circuit for limiting duty cycle according to the present disclosure.

The test results shown in FIG. 3A and FIG. 3B are for a DC switching power supply with a pulse signal frequency of 125 kHz (i.e., each period of the pulse signal is 8 μs), an input voltage of 35 V and an output current of 25 A. When the DC switching power supply is fully loaded, the time for a high level of the pulse signal is about 4.72p, that is to say, the required duty cycle is 4.72/8=59%.

The test result shown in FIG. 3A is a result without using the circuit for limiting duty cycle. A curve 301A represents the pulse signal received on the gate of the switch 201, a curve 302A represents the current flowing through a primary coil of the transformer, and a curve 303A represents a voltage difference Vas on the drain and source of the switch 201.

As shown in FIG. 3A, during the transition phase, the time of the high level of the pulse signal in each period, as represented by $\Delta t_A$ on the upper curve, may reach 6.17 μs, i.e., the duty cycle reaches 6.17/8=77.1%. Referring to the lower curve, it can be seen that the $V_{ds\_maxA}$ of the MOSFET-type switch may even reach 167V, the voltage is too high and the high voltage to which the MOSFET is subjected many times may cause the MOSFET to break down and be damaged.

The test result shown in FIG. 3B is a result of using the circuit for limiting duty cycle. The upper curve represents the pulse signal received on the gate of the switch 201, the middle curve represents the current flowing through a primary coil of the transformer, and the lower curve represents a voltage difference $V_{ds}$ across the drain and source on the switch 201.

As shown in FIG. 3B, during the transition phase, the time of the high level of the pulse signal in each period, as represented by $\Delta t_B$ on the upper curve, is about 5.12 μs, i.e., the duty cycle is 64%, only 5% higher than the required duty cycle of 59%, and much smaller than the duty cycle of 77.1% which is achieved when the circuit for limiting duty cycle is not used. Referring to the lower curve, it can be seen that the V ds ma, of the MOSFET-type switch is 150V, less than 167V which is achieved when the circuit for limiting duty cycle is not used, and thus the MOSFET-type switch is not subjected to a too high voltage.

In one example, as illustrated in FIG. 2, the comparison unit 24 further includes a diode Dl, a cathode of the diode D1 is connected to the reference power supply 25, an anode of the diode D1 is connected to the node A and the inverting input 242 of the comparison unit 24. The function of the diode will be described in detail below. Upon the normal operation according to the pulse signal, since the capacitor Cl is discharged at the rising edge of the pulse signal to be recharged, the capacitor Cl is not always charged and the voltage does not become excessively high. However, after the pulse signal disappears, since the capacitor is not discharged by the pulse signal and thus always in a charged state, and the voltage will increase to a higher voltage; when the voltage is too high, the output voltage $V_A$ will also become too high, so that the inverting input 242 of the comparison unit 24 will receive a higher voltage and may even damage the comparison unit 24. In one example, the turn-on voltage of the diode Dl is 0.7V, so that the voltage at the inverting input of the comparison unit 24 can be clamped at 5.7V without further increase, thereby protecting the circuit. Although the voltage at the inverting input 242 of the comparison unit 24 is limited by using the diode in this embodiment, those skilled in the art can envision other alternative embodiments. All such alternative embodiments capable of clamping the voltage at the inverting input of the comparison unit fall within the scope of the present disclosure.

As shown in FIG. 2, the non-inverting input 241 of the comparison unit 24 is also connected to ground via a capacitor C3, so that interference signals are filtered by the capacitor C3, so that the voltage at the non-inverting input 241 of the comparison unit 24 remains constant.

If the voltage at the inverting input 242 of the comparison unit 24 is greater than the reference voltage, the comparison unit 24 flips to output a low level. If at this time the voltage at the inverting input 242 is slightly less than the reference voltage due to the fluctuation, the comparison unit 24 will flip to output a high level. In order to prevent the occurrence of this fluctuation, as shown in FIG. 2, the non-inverting input 241 of the comparison unit 24 is also connected to the output 243 of the comparison unit 24 through a resistor R7, thereby performing the "backlash" control for the comparison unit 24. Through the resistor R7, when the comparison unit 24 outputs a low level, the voltage of the non-inverting input 241 is pulled low, so that even if the voltage of the inverting input terminal 242 reduces slightly, the comparison unit 24 still outputs a low level without flipping.

Without prejudice to the basic principle, the details and embodiments may vary, even significantly, with respect to what has been described by way of example only, without departing from the scope of protection. The various embodiments described above may be combined to provide additional embodiments. If concepts of the various patents, applications and publications need to be employed to provide yet further embodiment, aspects of the embodiments may be modified.

These and other changes can be made to the embodiments in light of the above detailed description. In general, in the following claims, the terms used should not be construed to limit the claims to the specific embodiments disclosed in the specification and the claims, but should be construed to include all possible embodiments and the full scope of equivalents to which such claims are entitled. Accordingly, the claims are not limited by the disclosure.

What is claimed is:

1. A circuit for limiting a duty cycle for a DC switching power supply, the DC switching power supply comprising a switch and a pulse signal generating unit, the pulse signal generating unit configured to generate a pulse signal having a duty cycle, the duty cycle being a ratio of a time of a first level of the pulse signal to a period, the duty cycle being capable of transitioning from a first current duty cycle to a second target duty cycle greater than the first current duty cycle due to a load increase within a plurality of periods, the circuit comprising:
a timing module electrically connected to an input voltage of the DC switching power supply to output a variable output voltage, wherein the timing module is configured to:
in each period of the pulse signal generated by the pulse signal generating unit, cause the variable output voltage to gradually increase from an initial value; and
in a certain period in which the duty cycle of the pulse signal is greater than a maximum limit duty cycle, cause the variable output voltage to increase to a voltage threshold within a time shorter than a duration time of the first level in the period, wherein the maximum limit duty cycle is greater than the second target duty cycle, and the voltage threshold corresponds to the maximum limit duty cycle; and
a switch control module electrically connected to the timing module, the pulse signal generating unit and the switch, and configured to:
in the certain period in which the duty cycle of the pulse signal is greater than the maximum limit duty cycle, output a first control signal enabling the switch to be turned on before the variable output voltage increases to the voltage threshold; and
output a second control signal enabling the switch to be turned off independently of the pulse signal after the variable output voltage increases to the voltage threshold.

2. The circuit according to claim 1, wherein the switch control module comprises:
a first input configured to receive the pulse signal from the pulse signal generating unit;
a second input configured to be connected to the timing module to receive a signal associated with the variable output voltage of the timing module, wherein upon determining that the variable output voltage is less than the voltage threshold, the associated signal is a first signal that enables the switch control module to amplify the received pulse signal, and upon determining that the variable output voltage is greater than or equal to the voltage threshold, the associated signal is a second signal that enables the switch control module not to amplify the received pulse signal; and
a control module output configured to: in each period of the pulse signal, upon determining that the second input receives the first signal, output a third control signal enabling the switch to be turned on according to the first level of the pulse signal and turned off according to a second level of the pulse signal opposite to the first level, and upon determining that the second input receives the second signal, output the second control signal.

3. The circuit according to claim 2, wherein the switch control module further comprises a comparison unit connected between the timing module and the second input of the switch control module, wherein the switch control module comprises:
a non-inverting input configured to be connected to a reference voltage source, a voltage value of a reference voltage output by the reference voltage source being related to the voltage threshold;
an inverting input configured to receive the variable output voltage of the timing module; and
a comparison unit output electrically connected to the second input of the switch control module,
wherein the comparison unit is configured to: upon determining that the variable output voltage received at the inverting input exceeds the reference voltage, output the second signal through the comparison unit output to the second input.

4. The circuit according to claim 3, wherein the comparison unit further comprises a clamp diode configured to clamp a maximum voltage at the inverting input to a particular voltage value.

5. The circuit according to claim 1, wherein the timing module comprises:
a capacitor, a first polar plate of the capacitor being connected to an input voltage of the DC switching power supply, and a second polar plate of the capacitor being grounded; and
a first switch connected in parallel with the capacitor,
wherein the first switch is configured to be switched on at a rising edge of each period of the pulse signal to discharge the capacitor, and to be switched off after the rising edge of each period of the pulse signal to charge the capacitor with the input voltage of the DC switching power supply, so as to gradually increase the variable output voltage of the timing module from the initial value.

6. The circuit according to claim 5, wherein:
the timing module further comprises a first resistor connected in series between the first polar plate of the capacitor and the DC switching power supply, the variable output voltage is a voltage at an end of the first resistor opposite to the DC switching power supply, and a time for the variable output voltage to increase to the voltage threshold is determined based at least in part on a resistance of the first resistor and a capacitance value of the capacitor.

7. The circuit according to claim 5, wherein:
the first switch comprises a transistor in parallel with the capacitor, and a transistor control circuit,
the transistor is configured to:
turn on at the rising edge of the pulse signal; and
turn off after the rising edge; and
the transistor control circuit is configured to:
receive the pulse signal; and
output a control signal controlling the transistor to turn on and turn off based on the pulse signal.

8. The circuit according to claim 7, wherein:
the transistor comprises:
a gate electrically connected to the transistor control circuit;
a source configured to be connected to ground; and
a drain configured to be connected to the first polar plate of the capacitor; and
the transistor control circuit comprises:
a further capacitor connected to the gate and configured to receive the pulse signal; and
a second resistor, a first end thereof being connected to a node between the further capacitor and the gate, and a second end thereof being grounded,
wherein the further capacitor is configured to be charged at the rising edge of each period of the pulse signal to turn on the transistor and be fully charged after the rising edge to turn off the transistor.

9. The circuit according to claim 5, wherein the input voltage of the DC switching power supply comprises a plurality of input voltages within a range, and wherein the plurality of input voltages at least comprises:
a first input voltage, the variable output voltage of the timing module rising to the voltage threshold at a first time corresponding to the first input voltage; and
a second input voltage, the variable output voltage of the timing module rising to the voltage threshold at a second time corresponding to the second input voltage,
wherein the first input voltage is less than the second input voltage, and the first time is longer than the second time.

10. A DC switching power supply having a constant output, the DC switching power supply comprising:
a switch; and
a pulse signal generating unit configured to generate a pulse signal having a duty cycle, the duty cycle being a ratio of a time of a first level of the pulse signal to a period, the duty cycle being capable of transitioning from a first current duty cycle to a second target duty cycle greater than the first current duty cycle due to a load increase within a plurality of periods; and
a circuit for limiting a duty cycle for the DC switching power supply, the circuit comprising:
a timing module electrically connected to an input voltage of the DC switching power supply to output a variable output voltage, wherein the timing module is configured to:
in each period of the pulse signal generated by the pulse signal generating unit, cause the variable output voltage to gradually increase from an initial value; and in a certain period in which the duty cycle of the pulse signal is greater than a maximum limit duty cycle, cause the variable output voltage to increase to a voltage threshold within a time shorter than a duration time of the first level in the period, wherein the maximum limit duty cycle is greater than the second target duty cycle, and the voltage threshold corresponds to the maximum limit duty cycle; and
a switch control module electrically connected to the timing module, the pulse signal generating unit and the switch, and configured to:
in the certain period in which the duty cycle of the pulse signal is greater than the maximum limit duty cycle, output a first control signal enabling the switch to be turned on before the variable output voltage increases to the voltage threshold; and
output a second control signal enabling the switch to be turned off independently of the pulse signal after the variable output voltage increases to the voltage threshold.

11. The DC switching power supply according to claim 10, wherein the switch control module comprises:
a first input configured to receive the pulse signal from the pulse signal generating unit;
a second input configured to be connected to the timing module to receive a signal associated with the variable output voltage of the timing module, wherein upon determining that the variable output voltage is less than the voltage threshold, the associated signal is a first signal that enables the switch control module to amplify the received pulse signal, and upon determining that the variable output voltage is greater than or equal to the voltage threshold, the associated signal is a second signal that enables the switch control module not to amplify the received pulse signal; and
a control module output configured to: in each period of the pulse signal, upon determining that the second input receives the first signal, output a third control signal enabling the switch to be turned on according to the first level of the pulse signal and turned off according to a second level of the pulse signal opposite to the first level, and upon determining that the second input receives the second signal, output the second control signal.

12. The DC switching power supply according to claim 11, wherein the switch control module further comprises a comparison unit connected between the timing module and the second input of the switch control module, wherein the switch control module comprises:
a non-inverting input configured to be connected to a reference voltage source, a voltage value of a reference voltage output by the reference voltage source being related to the voltage threshold;
an inverting input configured to receive the variable output voltage of the timing module; and
a comparison unit output electrically connected to the second input of the switch control module,
wherein the comparison unit is configured to: upon determining that the variable output voltage received at the inverting input exceeds the reference voltage, output the second signal through the comparison unit output to the second input.

13. The DC switching power supply according to claim 12, wherein the comparison unit further comprises a clamp diode configured to clamp a maximum voltage at the inverting input to a particular voltage value.

14. The DC switching power supply according to claim 10, wherein the timing module comprises:
a capacitor, a first polar plate of the capacitor being connected to an input voltage of the DC switching power supply, and a second polar plate of the capacitor being grounded; and
a first switch connected in parallel with the capacitor,
wherein the first switch is configured to be switched on at a rising edge of each period of the pulse signal to discharge the capacitor, and to be switched off after the rising edge of each period of the pulse signal to charge the capacitor with the input voltage of the DC switching power supply, so as to gradually increase the variable output voltage of the timing module from the initial value.

15. The DC switching power supply according to claim 14, wherein:
the timing module further comprises a first resistor connected in series between the first polar plate of the capacitor and the DC switching power supply,
the variable output voltage is a voltage at an end of the first resistor opposite to the DC switching power supply, and
a time for the variable output voltage to increase to the voltage threshold is determined based at least in part on a resistance of the first resistor and a capacitance value of the capacitor.

16. The DC switching power supply according to claim 14, wherein the input voltage of the DC switching power supply comprises a plurality of input voltages within a range, and wherein the plurality of input voltages at least comprises:
a first input voltage, the variable output voltage of the timing module rising to the voltage threshold at a first time corresponding to the first input voltage; and
a second input voltage, the variable output voltage of the timing module rising to the voltage threshold at a second time corresponding to the second input voltage,
wherein the first input voltage is less than the second input voltage, and the first time is longer than the second time.

17. The DC switching power supply according to claim 14, wherein:
the first switch comprises a transistor in parallel with the capacitor, and a transistor control circuit,
the transistor is configured to:
turn on at the rising edge of the pulse signal; and
turn off after the rising edge; and
the transistor control circuit is configured to:
receive the pulse signal; and
output a control signal controlling the transistor to turn on and turn off based on the pulse signal.

18. The DC switching power supply according to claim 17, wherein:
the transistor comprises:
a gate electrically connected to the transistor control circuit;
a source configured to be connected to ground; and
a drain configured to be connected to the first polar plate of the capacitor; and
the transistor control circuit comprises:
a further capacitor connected to the gate and configured to receive the pulse signal; and
a second resistor, a first end thereof being connected to a node between the further capacitor and the gate, and a second end thereof being grounded,
wherein the further capacitor is configured to be charged at the rising edge of each period of the pulse signal to turn on the transistor and be fully charged after the rising edge to turn off the transistor.

* * * * *